United States Patent Office 3,717,705
Patented Feb. 20, 1973

3,717,705
PROTEIN-BACTERIOPHAGE CONJUGATES
Joseph Haimovich, 12 Krumer St., and Michael Sela, Meonot Wix, both of Rehovot, Israel
No Drawing. Filed Jan. 9, 1970, Ser. No. 1,848
Claims priority, application Great Britain, Jan. 16, 1969, 2,697/69
Int. Cl. G01n 31/02, 33/16
U.S. Cl. 424—12
6 Claims

ABSTRACT OF THE DISCLOSURE

The novel conjugates are prepared by using bifunctional molecules as linking agents. The conjugates which survive the coupling process can be used for detecting and determining quantitatively very small quantities of anti-protein antibodies. Quantities as little as 0.2 to 2.0 nanograms per milliliter of antiserum can be detected. Insulin-bacteriophage conjugate was inactivated to a significant extent by sera of diabetic patients, who had received injections of insulin, which was diluted a hundred to ten-thousand fold. The inactivation of protein-bacteriophage conjugates by the corresponding anti-protein can be inhibited by the addition of predetermined quantities of the said protein and this inhibition can be used for the determination of very small quantities of the protein.

BACKGROUND OF THE INVENTION

The immunospecific inactivation of bacteriophages is amongst the most sensitive methods for the detection of very small amounts of antibodies, and has been used for immunological studies. However, this assay is limited to the detection of antibodies directed against the bacteriophages. It was of interest to extend this sensitive assay to antigens of other specificities. This was achieved for various haptens by their attachment to bacteriophages.

PRIOR ART

The immunospecific inactivation of bacteriophages has been used extensively for a very sensitive assay of anti-bacteriophage antibodies, see Attardi et al. Bac. Rev. 23, 213 (1959). Recently various haptens, such as 2,4- dinitrophenyl groups, have been bonded to bacteriophages. All the known modifications of bacteriophages were prepared by the reaction of an active derivative of a small molecule with the bacteriophage. Immunologically such a small molecule is only a hapten and not an antigen.

SUMMARY OF THE PRESENT INVENTION

The present invention relates to novel protein-bacteriophage conjugates. It further relates to protein-bacteriophage conjugates wherein the protein is an antigen. The invention further relates to a novel sensitive assay for the detection and for the quantitative determination of very small quantities of proteins and antibodies. Quantities of antibodies as small as 0.2 to 2.0 nanograms ($10^{-9}$ g.) per 1 ml. of antiserum can be detected and determined. Insulin-bacteriophage conjugate was inactivated to a significant extent by sera of diabetic patients, who had received injections of insulin, which serum was diluted a hundred to ten-thousand fold.

The proteins and the antibodies can be linked covalently to the bacteriophages, and the resulting surviving protein-bacteriophage and antibody-bacteriophage conjugates can be used for the detection and determination of antibodies and proteins, respectively.

A quantitative determination of proteins can be effected by the inactivation of protein-bacteriophage conjugate by anti-protein, and the inhibition of this inactivation of the protein-bacteriophage conjugate by addition of predetermined quantities of the protein used. By this method very small quantities of proteins can be determined. Certain proteins can be determined in as low quantities as 0.3 nanogram per milliliter.

The chemical bonding is effected via an intermediate link. As linking agent, for the covalent bonding of the protein to the bacteriophase, there is advantageously used a small bifunctional, chemically reactive molecule adapted to form covalent bonds with both moieties. Examples of such compounds useful for the covalent bonding of protein molecules to bacteriophage are tolylene-2,4-diisocyanate (TIDC), bisdiazobenzidine (BDB) and glutaraldehyde. It will be clear to those versed in the art that other suitable bifunctional compounds can be used in a similar manner as linking agents.

Bacteriophage (T–4, T–2 etc.) was grown, purified and assayed according to the method described by Haimovich et al. Immunology, 97, 338 (1966).

The bacteriophage and its host bacterium, *Escherichia coli B* were grown according to the procedure of Adams: "Bacteriophages," Interscience Publishers, New York (1959) and purified according to the method of Putnam et al., J. Biol. Chem. 179 (1949), 303. The assay was made according to the double agar layer method described by Adams (see above reference).

Bacteriophage solutions were kept in 0.05 M sodium phosphate buffer, pH 6.8, which contained also 20 µg. of gelatin per milliliter. This buffer was also used as a diluent for bacteriophage and for antisera. Bacteriophage T4 solutions at a concentration of $10^{11}$ PFU/ml. (plaque-forming units per milliliter) had an optical density of 1.0 units at 260 mµ at a path length of 1 cm.

Immunoglobulin $G^{38}$ (IgG) was prepared from normal serum according to the procedure of Levy et al., Proc. Soc. Exptl. Biol. Med. 103 (1960), 250. Other antigens and proteins were obtained from commercial sources.

Antisera and purified antibody preparations were prepared or obtained from commercial sources. Rabbits and goats were injected twice with 2–5 mg. antigen incorporated into complete Freund's adjuvant (Difco, Detroit, Mich.). The antigen-adjuvant mixture was injected intradermally at multiple sites all over the body. Guinea pig anti-insulin serum was obtained from Welcome Foundation Laboratories, Beckenham, England. Goat antiserum against guinea pig immunoglobulin G (IgG) was obtained from Miles-Yeda Ltd., Rehovoth, Isreal. The immunospecific isolation of antibodies was performed with immuno-adsorbants prepared by coupling he antigens to bromoacetyl cellulose according to Robbins et al., Immunochemistry, 4 (1967) 11. The concentration of antibodies in the serum was determined by quantitative precipitin analysis, Kabat and Mayer's Experimental Immunochemistry, 2nd. Edition, C. C. Thomas, 1961. The concentration of protein in the isolated antibody preparation was calculated from the absorbance, using for 1 mg./ml. solution an $$E_{280 m\mu}^{1 cm.} \text{ of } 1.40$$

Tolylene-2,4-diisocyanate used as coupling agent, was obtained from Aldrich, Milwaukee, Wis.; and bis-diazobenzidine was prepared and stored according to Gordon et al., J. Exp. Med. 108 (1958) 37. Glutaraldehyde was obtained from Fluka, Switzerland as 25 percent aqueous solution.

Inactivation of protein-phage conjugates by anti-protein sera and by antiprotein isolated antibody preparations:

Antisera or pure antibody prepartions at several dilutions (0.05 ml.) and modified bacteriophage solutions (0.05 ml. containing 500–1000 PFU) were mixed and kept at 37° C. for different periods of time. At the end of the inactivation reaction, 2.5 ml. of soft agar containing $3.10^9$ of bacteria, were added to the test tubes and the whole mixture poured onto plates of bottom layer agar. Plaques were counted after leaving the plates for 10–18 hours at 37° C. The above described procedure is known as the direct plating method. Inactivation of modified phage by the "decision technique" (Jerne et al., J. Immunol. 76 (1956), 200) was performed in a similar manner, except that the bacteria were added to the reaction mixture at the end of the inactivation reaction and the tubes were shaken gently for 10 minutes. A hyperimmune anti-T4 serum (or corresponding serum for other phages) was then added for an additional 4 minutes. The final concentration of the anti-phage serum in the reaction mixture was chosen so as to give 99.9 percent inactivation of the modified phase within 4 minutes reaction time. Soft agar was added into the tubes and the whole mixture plated. The complex inactivation method [Goodman et al. Immunochem. 2 (1965) 351; Krummel et al. J. Immunol. 102 (1969) 772] is similar to the direct plating method except that a serum against the globulin fraction or against the whole serum is added to the reaction mixture 10 minutes before plating.

Detection of anti-insulin antibodies using radioactive insulin:

The detection of anti-insulin antibodies in the sera of diabetic patents using radioactive insulin was performed according to Welborn et al., Brit. Med. J. 1 (1967) 719.

Preparation of protein-bacteriophage T4 conjugates using TDIC as bifunctional reagent:

To 0.3 ml. of bacteriophage T4 solution $$(OD_{260\,m\mu}^{1\,cm} = 200)$$

0.3 ml. of protein solution in PBG was added at several concentrations (10–50 mg./ml.), (except for insulin which was dissolved in 0.3 M sodium carbonate buffer, pH 9.5). To this mixture 0.1 ml. of a solution of TDIC in dioxane (0.3%–3.0% v./v.) was added slowly with stirring. The reaction mixture was allowed to stand for 1 hour at 24° C. At the end of the reaction, 5 ml. of PBG were added and the mixture was dialyzed against 6 liters of 0.05 M sodium phosphate buffer, pH 6.8. Any precipitate was removed by centrifugation at low speed. The protein-bacteriophage conjugate was separated from the lighter unreacted protein by two successive centrifugations for 1 hour at 20,000 g., the pellet being resuspended in PBG. The concentration of phage particles was determined by the absorbancy at 260 m$\mu$, and the concentration of viable phage was determined by plating serial fifty-fold dilutions of the preparations. From the above concentrations the percentage of the modified bacteriophage surviving the coupling process was calculated. The optimum conditions for the coupling of several proteins is given in Table I.

TABLE I

| Example | Protein coupled | Protein, mg./ml.[1] | TDIC, percent v./v.[1] | Surviving phage, percent[2] | Antibody detected, nanog./ml.[3] |
|---|---|---|---|---|---|
| 1 | RNase | 7 | 0.008 | 1.1 | 2 |
| 2 | BSA | 11 | 0.2 | 0.05 | 2 |
| 3 | RSA | 17 | 0.6 | 0.05 | 1 |
| 4 | Rabbit IgG | 9 | 0.016 | 0.6 | 0.5 |
| 5 | Lysozyme | 21 | 0.0025 | 80.0 | 0.2 |
| 6 | Insulin | 17 | 0.2 | 0.1 | ([4]) |

[1] Final concentration in the reaction mixture.
[2] The percentage of phage surviving the coupling process was calculated from the number of plaque forming units and the optical density of the modified phage preparation.
[3] This is the lowest concentration of antibody detected from the dilution of serum (of known antibody content), which gives 50 percent inactivation of the protein-phage conjugate after reaction for 10 hours at 37° C.
[4] Not determined. A guinea pig anti-insulin serum inactivated 50% of the insulin-T4 conjugate after 10 hours reaction at 37° C. at a final dilution 1:10⁷. The concentration of antibodies in the serum could not be evaluated as antibodies were not precipitated by antigen.

EXAMPLE 7

Preparation of ribonuclease-bacteriophage T4 conjugate with bis-diazo-benzidine (BDB) as bifunctional reagent To 0.1 ml. of bacteriophage T4 solution $$(OD_{260\,m\mu}^{1\,cm} = 200)$$

there was added 0.1 ml. of protein solution in PBG (10–50 ml.). To this mixture 0.03–0.1 ml. of BDB solution diluted 1:15 into PBG were added; the reaction mixture was left for 15 minutes at 24° and then diluted, dialyzed, centrifuged and assayed in a manner similar to that of the preceding examples. The best preparation, with the highest sensitivity to inactivation by anti-RNase serum, was obtained with 10 mg./ml. RNase and 0.03 ml. BDB solution.

The final concentration of protein in the reaction mixture was 4.3 mg./ml., and 5 percent of the phage survived. 12 nanograms per ml. could be determined (antibody).

Preparation of protein-bacteriophage T4 conjugates using glutaraldehyde as bifunctional reagent To 0.1 ml. of bacteriophage T4 solution $$(OD_{260\,m\mu}^{1\,cm} = 200)$$

there was added 0.1 ml. of protein solution in PBG (10–50 mg./ml.). To this mixture, 0.025 ml. of glutaraldehyde (0.05–0.2%, v./v.) was added, the reaction mixture was left for 1 hour at 24° C. and diluted, dialyzed, centrifuged and assayed as described in the preceding examples. The optimum conditions are indicated in Table II.

TABLE II

| Example | Protein coupled | Protein, mg./ml.[1] | Coupling agent, percent, v./v.[1] | Surviving phage, percent[2] | Antibody detected, nanog./ml.[3] |
|---|---|---|---|---|---|
| 9 | RNase | 4.3 | Text | 7.4 | 2.0 |
| 10 | Lysozyme | 10.0 | do | 36.0 | 0.2 |

NOTE.—For explanation of references, see Table I.

EXAMPLE 8

Preparation of bovine serum albumin (BSA)-bacteriophage T2 conjugate and inactivation by anti-BSA-serum 0.3 ml. of bovine serum albumin (BSA) (Worthington) solution of 25 mg./ml. were mixed with 0.3 ml. bacteriophage T2 solution in 0.05 M phosphage buffer, pH 7.0 containing 20 $\mu$g./ml. gelatin. The bacteriophage T2 was prepared as the T4 in the preceding examples. The bacteriophage solution had an $$OD^{1\,cm.}_{260\,m\mu} = 200$$

To this mixture there was added 0.1 ml. of TDIC solution, 15 mg./ml. in dioxane and the reaction mixture was maintained 2 hours at 24° C. The reaction was terminated by dialysis against the above buffer (2 changes against 6 liters buffer). The unreacted protein was removed by spinning down the modified bacteriophage for 1 hour at 20,000 g., discarding the supernatant and redissolving the bacteriophage in 0.05 M phosphate buffer of pH 7.0. Of the initial bacteriophage population, 0.05% survived the coupling procedure.

The BSA-bacteriophage conjugate was specifically inactivated by anti-BSA serum prepared by injecting a rabbit with 2 mg. BSA emulsified in complete Freund's adjuvant (Difco), 1 part solution BSA and 2 parts adjuvant. There was no inactivation of the BSA-bacteriophage conjugate by sera of non-injected rabbits. A 50% inactivation was obtained by reacting it for 10 hours at 37° C. with the anti-BSA serum at a dilution of a final concentration of 2 nanograms antibody/ml. The antibody content of the serum was determined by quantitative precipitin analysis. The anti-BSA-serum had no effect on the unmodified bacteriophage T2.

EXAMPLE 11

Inactivation of insulin-bacteriophage T4 conjugate

The inactivation of insulin-bacteriophage T4 conjugate was effected by means of guinea pig anti-insulin serum. Inactivation determined by direct plating and complex inactivation methods were identical. With both methods the curve levels off, leaving about 5% surviving phage even at high antibody concentrations. The inactivation was also determined with serum from diabetic patients who had received insulin injections. An inactivation of 50% of insulin-T4 conjugate was obtained with human serum diluted 5000-fold. The same serum bound 25 percent of radioactive insulin when tested by the ethanol precipitation test (Welborn el al., Brit. Med. J. 1 (1967) 719). The serum of another diabetic patient, which gave only 10 percent binding of radioactive insulin, caused 50 percent inactivation of insulin-T4 after incubation for 2 hours at a dilution of 1:200. Insulin-T4 was not inactivated at all by sera from normal individuals at a final dilution of 1:10.

The "soft agar" mentioned contains: 10 g. "Bacto tryptone," 6 g. "Bacto agar," 8 g. NaCl, 2 g. sodium citrate and 3 g. glucose, dissolved in 1 l. water.

The "bottom layer agar" contains the same ingredients as the soft agar, except that the agar is more concentrated: 10 g./liter.

The abbreviations used are: PBG=0.05 M sodium phosphate buffer, pH 6.8 containing 20 $\mu$g./ml. gelatin; IgG=immunoglobulin $G^{38}$; RNase=bovine pancreatic ribonuclease A; BSA=bovine serum albumin; RSA=rabbit serum albumin; PFU=plaque forming units.

From the foregoing it is clear that proteins can be bonded covalently to bacteriophages and that the modified bacteriophage preparation can be used for the detection and determination of as little as 0.2 nanogram of antiprotein antibodies per ml.

With most of the proteins attached to the bacteriophage, the great majority of the phage population was inactivated during the coupling process, see Table I and II. The surviving phage was efficiently inactivated by the antiprotein antiserum. Storage of up to 1 year decreased the concentration of viable phage in some preparations, whereas others (insulin-T4; lysozyme-T4) did not decrease. Only in one case (BSA-T4) was there a decrease of sensitivity to inactivation.

The inactivation of protein-bacteriophage conjugates by protein antibodies may be inhibited by the addition of the free protein. This is described in the following.

The inhibition of inactivation of protein-bacteriophage conjugates was performed by the complex inactivation method described above, except that 0.075 ml. of the antiserum (at a dilution required for 90–95% inactivation of the phage after 2 hours incubation at 37° C.) was mixed with 0.025 ml. of the inhibitory protein and the mixture was left for 24–48 hours at 4° C. prior to the addition of 0.05 ml. of the protein-bacteriophage conjugate. The concentration of insulin in human sera was determined by radio-immunoassay according to Hales & Randle. Insulin concentration is expressed either in weight per volume units or in international units. The correlation between these two measurements was considered to be 25 international units per 1 mg. of insulin. In the case of insulin, 0.025 ml. of human serum was added instead of the insulin solution (human insulin was also dissolved in the serum). The human serum used as diluent for the insulin and as a control had a very low insulin content as determined by the radio-immunoassay (less than 0.2 ng./ml.). It did not inactivate insulin-bacteriophage-T4 conjugate. During the inhibition experiments, when the inhibitory protein was added prior to the addition of the phage, the extent of inactivation of the protein-phage conjugates was reduced corresponding to the inactivation by lower concentrations of antibodies than that present originally in the tube of the inhibition experiment.

The extent of inhibition was calculated from the extent of inactivation in the presence and in the absence of inhibitory protein.

For example, anti-lysozyme serum at a final dilution of 3.10$^{-6}$, when reacted with lysozyme-T4 conjugate at an initial concentration of 6000 PFU/ml. caused the decrease in the concentration of the surviving phage to 490 PFU/ml. after 2 hours at 37° C. In the presence of free lysozyme at a final concentration of 5.6.10$^{-6}$ mg./ml. and at the same conditions of initial antibody and phage concentrations, the concentration of surviving phage decreased to 1700 PFU/ml. This extent of inactivation is equal to that obtained with only 20% of the initial antibody concentration, and is therefore considered to be due to the blocking of 80% of the antibodies present in the tube, corresponding to 80% inhibition. The results of the inhibition of inactivation of protein-bacterio-phage conjugates by the corresponding free proteins at different concentrations are summarized in the following Table III.

TABLE III

Detection and quantitation of proteins by inhibition of inactivation of protein-bacteriophage conjugates

| Protein bacteriophage conjugate | Concentration of antigen in nanograms/ml. required for inhibition of: | | | |
|---|---|---|---|---|
| | 25% | 50% | 75% | 90% |
| RSA-T4 | 2.0 | 8.0 | 40 | 800 |
| RNase-T4 | 0.4 | 3.0 | 60 | 200 |
| Lysozyme-T4 | 0.4 | 1.0 | 4.0 | 10 |
| IgG-T4 | 0.05 | 0.3 | 1.5 | 5.0 |
| Insulin-T4 | 0.05 | 0.15 | 0.4 | 0.7 |

From this table it is clear that as little as 0.05 mg./ml. of either insulin or rabbit IgG could be detected and determinined in a significant manner (25% inhibition).

The concentration of insulin in a series of human sera was determined by both the inhibition of inactivation of insulin-T4 and by radioimmunoassay. The results obtained are summarized in Table IV:

TABLE IV

Determination of insulin concentration in human sera by inhibition of inactivation of insulin-bacteriophage conjugate and by radioimmunoassay

| | in $\mu$u./ml. | |
|---|---|---|
| Serum No. | Phage | Radio-immuno-assay |
| 1 | 34 | 40 |
| 2 | 150 | 187 |
| 3 | 250 | >200 |
| 4 | 13 | 24 |
| 5 | 126 | 138 |
| 6 | 15 | 5 |
| 7 | 170 | 66 |
| 8 | 350 | >200 |
| 9 | 42 | 35 |
| 10 | 33 | 26 |

With most of the sera tested, the correlation was good. For determination of insulin by the inhibition of inactivation of insulin-T4 in sera with high hormone content (100–300 $\mu$u./ml.) the sera were diluted 3-fold and 10-fold into normal sera and tested as usual. The sera tested for the determination of insulin concentration were also checked for their capacity to inactivate insulin-T4 conjugate. No such inactivation was observed.

The experiments were repated with other bacteriophage types, such as T2 etc., and similar results were obtained.

A further run was made with rabbit immunoglobulin G (RGG). The inactivation of RGG-phage by means of anti-RGG was inhibited by means of RGG. A quantity of 0.2 ml. of RGG (1 ng./ml.) was mixed with 0.2 ml. of diluted anti-RGG serum (2 ng. antibody/ml.) and left for 3 hours at 37° C. RGG-phage conjugate (0.2 ml. containing 500 PFU) was added and the mixture was maintained an additional 20 hours at 37° C. In parallel, a run was carried out in which buffer alone was added instead of RGG solution. The modified phage was inactivated to the extent of 70% in the absence of RGG, whereas only 40% of the phages were inactivated in the presence of this concentration of RGG. Higher concentrations of RGG in the reaction mixture inhibited the inactivation of RGG-phage to higher extents. Total inhibition was reached with 30 nanograms RGG per ml.

It is clear that the description is illustrative only and that various modifications in the nature of phages, of the linking agent and in the nature of the proteins (which term includes the anti-proteins bonded) can be resorted to without departing from the scope and spirit of the invention. As will be evident to those versed in the art, such preparations and tests can be extended to detect and determine proteins such as protein hormones, toxins, enzymes etc.

We claim:

1. A method for the detection and quaititative determination of proteins and antiprotein antibodies by the inactivation of a protein-bacteriophage or an antibody-bacteriophage conjugate, respectively, which comprises:
   (a) covalently bonding the molecules of a protein or the corresponding antiprotein antibodies to a bacteriophage capable of growth on *E. coli;*
   (b) inactivating the resulting protein-bacteriophage or antibody-bacteriophage conjugate by treating the same with the corresponding antiprotein or protein, respectively;
   (c) inoculating a bacterium which is a host for the bacteriophage with the thus inactivated conjugate;
   (d) growing a culture of said bacterium; and
   (e) determining the amount of plaque formation in said culture, the degree of plaque formation being inversely proportional to the concentration of the antiprotein or protein, respectively, admixed with the conjugate in step (b) above.

2. The method of claim 1, in which covalent bonding of the protein-bacteriophage or antibody-bacteriophage conjugate is effected by bifunctional radicals of tolylene-2,4-diisocyanate, bis-diazobenzidine, or glutaraldehyde.

3. The method of claim 1, in which the protein bonded to the bacteriophage is immunoglobulin, bovine pancreatic ribonuclease, bovine serum albumin, rabbit serum albumin, lysozyme, insulin, or any of the corresponding antiprotein antibodies.

4. A method for the detection and quantitative determination of proteins and antiprotein antibodies by inhibition of the inactivation of a protein-bacteriophage or an antibody-bacteriophage conjugate, respectively, which comprises:
   (a) mixing an antiprotein or protein capable of inactivating a protein-bacteriophage or antibody-bacteriophage conjugate with the corresponding protein or antiprotein, respectively, capable of inhibiting such inactivation;
   (b) covalently bonding molecules of said inhibitory protein or antiprotein to a bacteriophage capable of growth on *E. coli;*
   (c) treating the resulting protein-bacteriophage or antibody-bacteriophage conjugate with the mixture formed in step (a) above;
   (d) inoculating a bacterium which is a host for the bacteriophage with the thus treated conpugate;
   (e) growing a culture of said bacterium; and
   (f) determining the amount of plaque formation in said culture, the degree of plaque formation being directly proportional to the concentration of the inhibitory protein or antiprotein mixed in step (a) above.

5. The method of claim 4, in which covalent bonding of the protein-bacteriophage or antibody-bacteriophage conjugate is effected by bifunctional radicals of tolylene-2,4-diisocyanate, bis-diazobenzidine, or glutaraldehyde.

6. The method of claim 4, in which the protein bonded to the bacteriophage is immunoglobulin, bovine pancreatic ribonuclease, bovine serum albumin, rabbit serum albumin, lysozyme, insulin, or any of the corresponding antiprotein antibodies.

References Cited

UNITED STATES PATENTS

| 3,553,310 | 1/1971 | Csizmas | 424—12 |
| 3,562,384 | 2/1971 | Arquilla | 424—12 |

OTHER REFERENCES

Chem. Abs. vol. 65, 1966 p. 15916.

Haimovich, Nature, vol. 214, June 24, 1967 pp. 1369–1370.

ALBERT T. MEYERS, Primary Examiner

A. P. FAGELSON, Assistant Examiner

U.S. Cl. X.R.

424—13, 89